United States Patent [19]

Kirkman

[11] Patent Number: 4,773,066
[45] Date of Patent: Sep. 20, 1988

[54] SYNCHRONIZED MULTIPLE ACCESS APPARATUS AND METHOD FOR A LOCAL AREA NETWORK

[75] Inventor: W. Worth Kirkman, Fairfax, Va.

[73] Assignee: The Mitre Corporation, Bedford, Mass.

[21] Appl. No.: 852,432

[22] Filed: Apr. 15, 1986

[51] Int. Cl.⁴ ............................................... H04J 3/26
[52] U.S. Cl. .......................................... 370/85; 370/94
[58] Field of Search ....................... 370/94, 85, 87, 60; 340/825.51, 825.5

[56] References Cited

U.S. PATENT DOCUMENTS

| | | | |
|---|---|---|---|
| 4,538,263 | 8/1985 | Gabrielli et al. | 370/87 |
| 4,562,573 | 12/1985 | Murano et al. | 370/85 |
| 4,637,015 | 1/1987 | Bobey | 370/85 |

*Primary Examiner*—Douglas W. Olms

[57] ABSTRACT

The present access protocol for contention networks results in synchronous network operation. Each node determines the next transmission instant by counting from the beginning of the most recently received packet of information a time equal to that packet's labeled length minus the previously measured round trip propagation delay seen by the node. Subsequent instants will occur at intervals equal to the maximum propagation delay allowed on the network. Each time a subsequent packet is received, synchronization is rederived based on the packet. If no packets are received within predetermined slots, the network is considered to be in asynchronous mode, with transmissions allowed at any time following the next slot. The disclosed packet synchronized multiple access (PSMA) protocol improves the performance measures by which local area networks are evaluated.

4 Claims, 11 Drawing Sheets

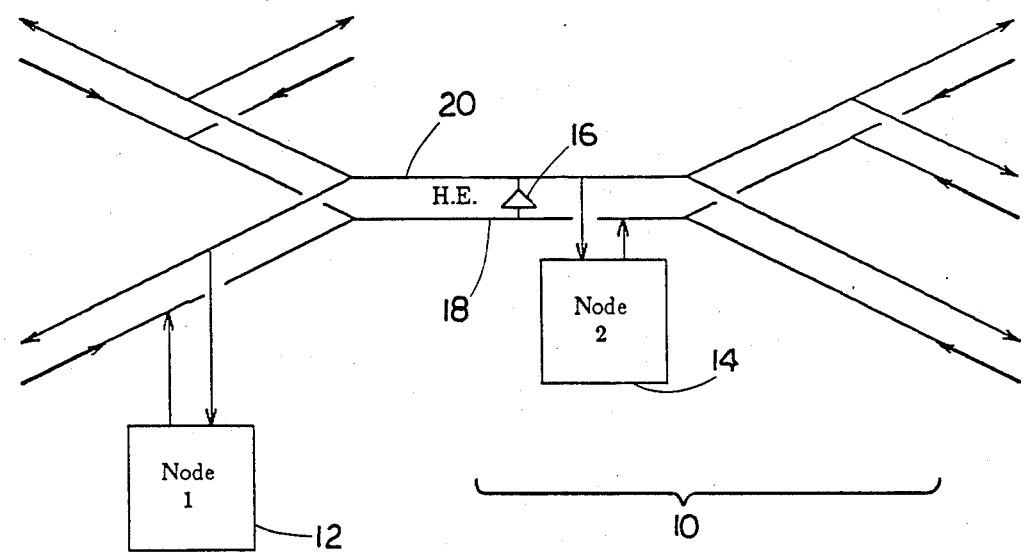
Figure 1    Broadband Network

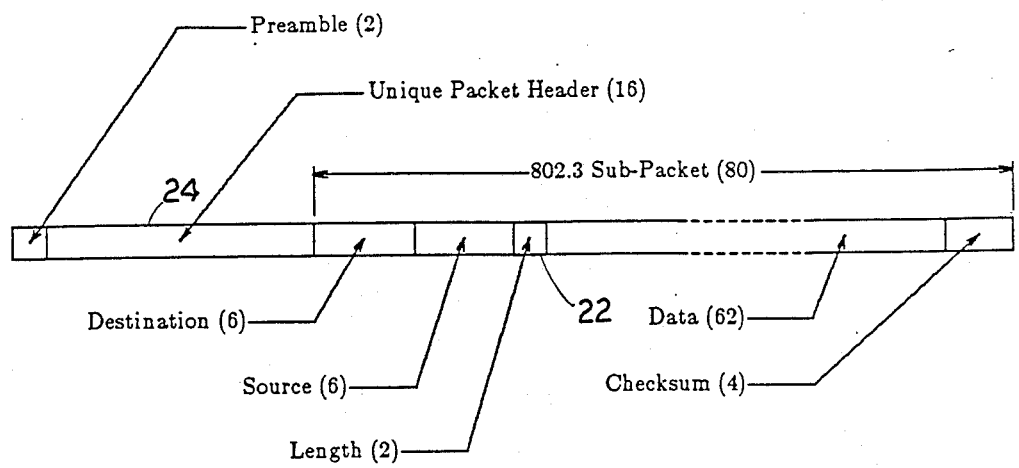
Figure 2    Packet Definition

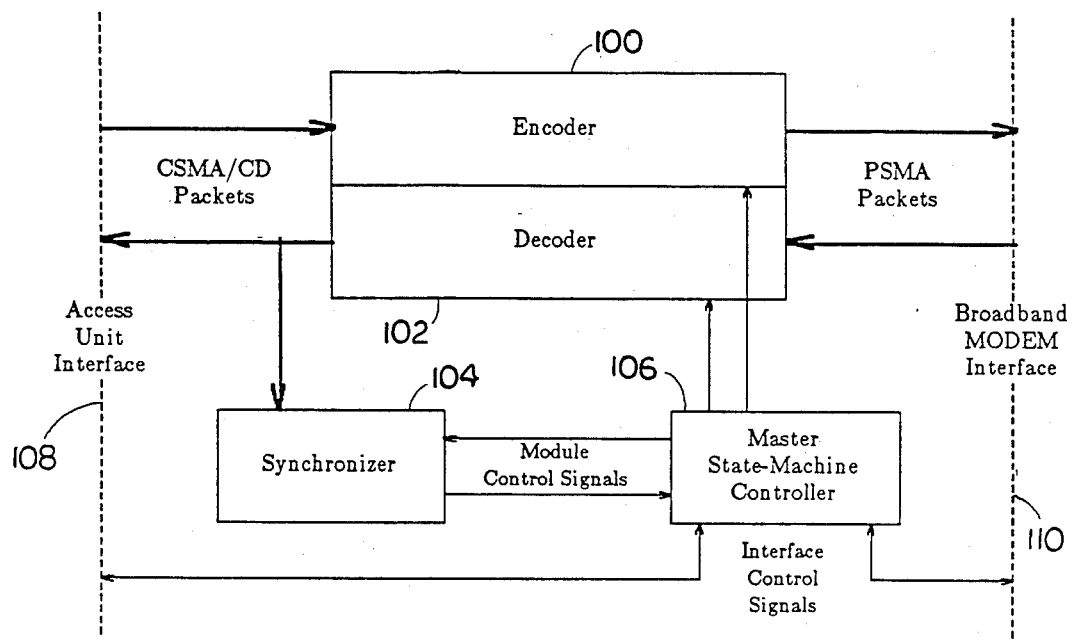
Figure 3  802.3 / PSMA Converter Architecture

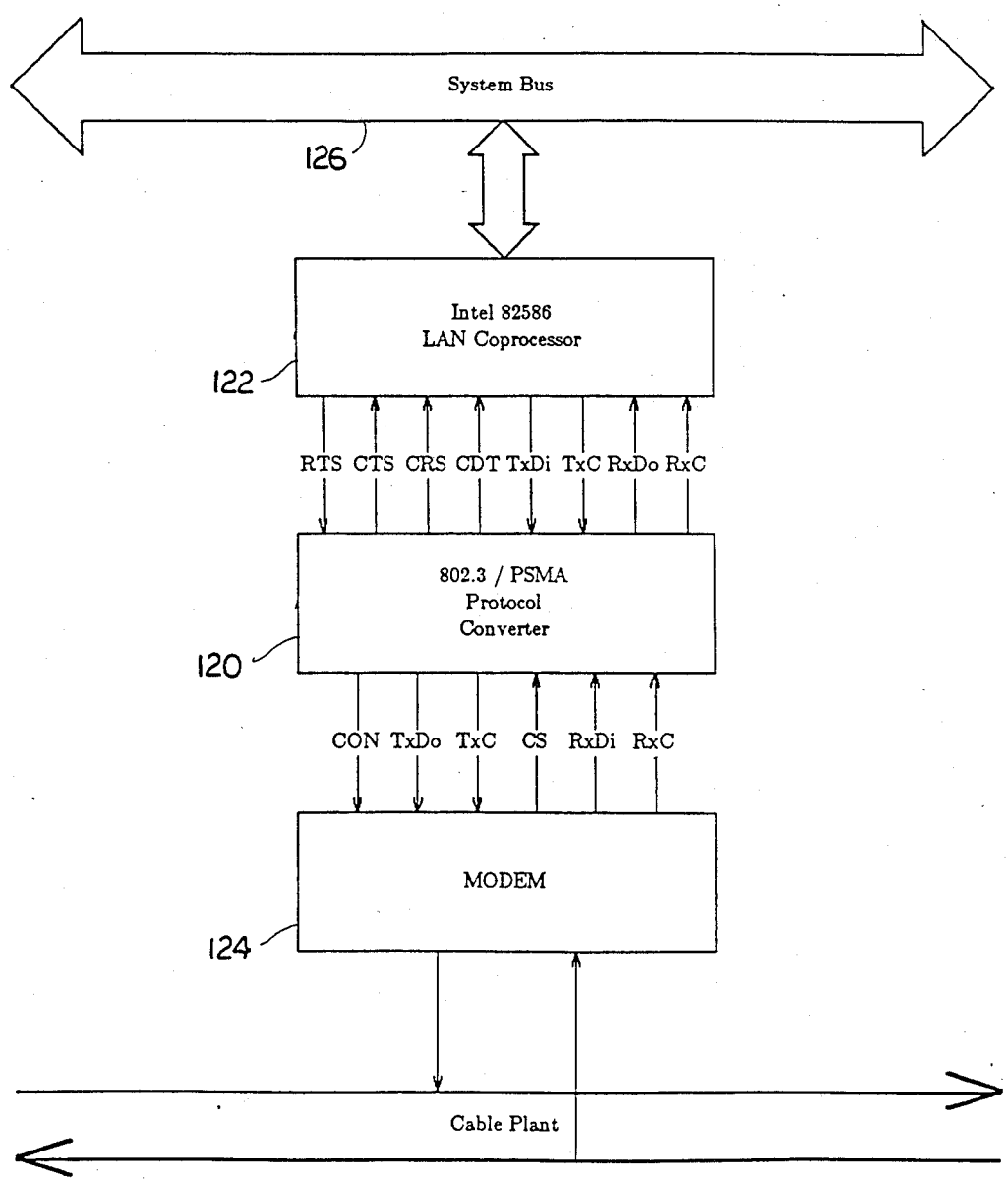
Figure 4      Support Circuitry

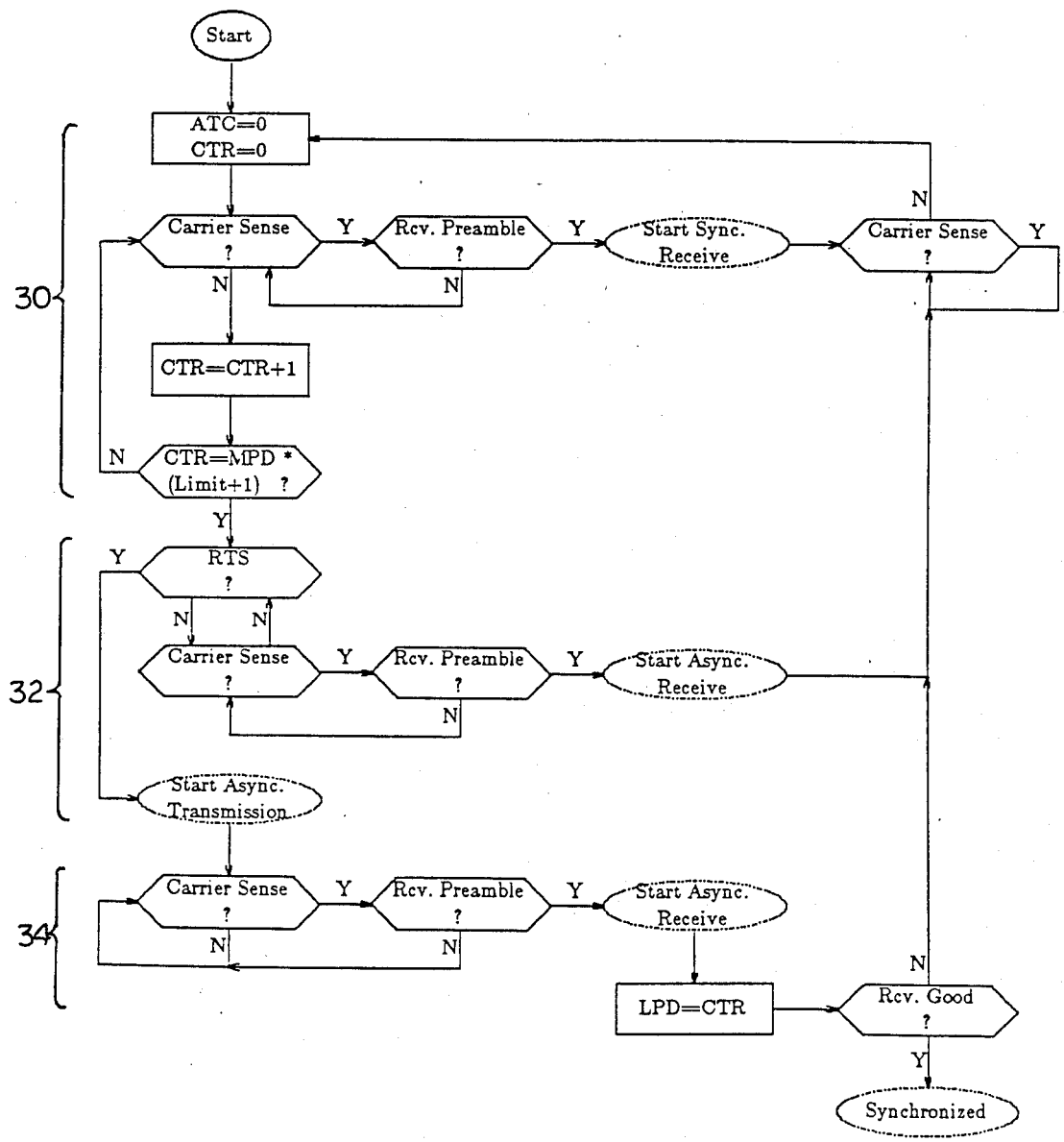
Figure 5-A  Getting Started

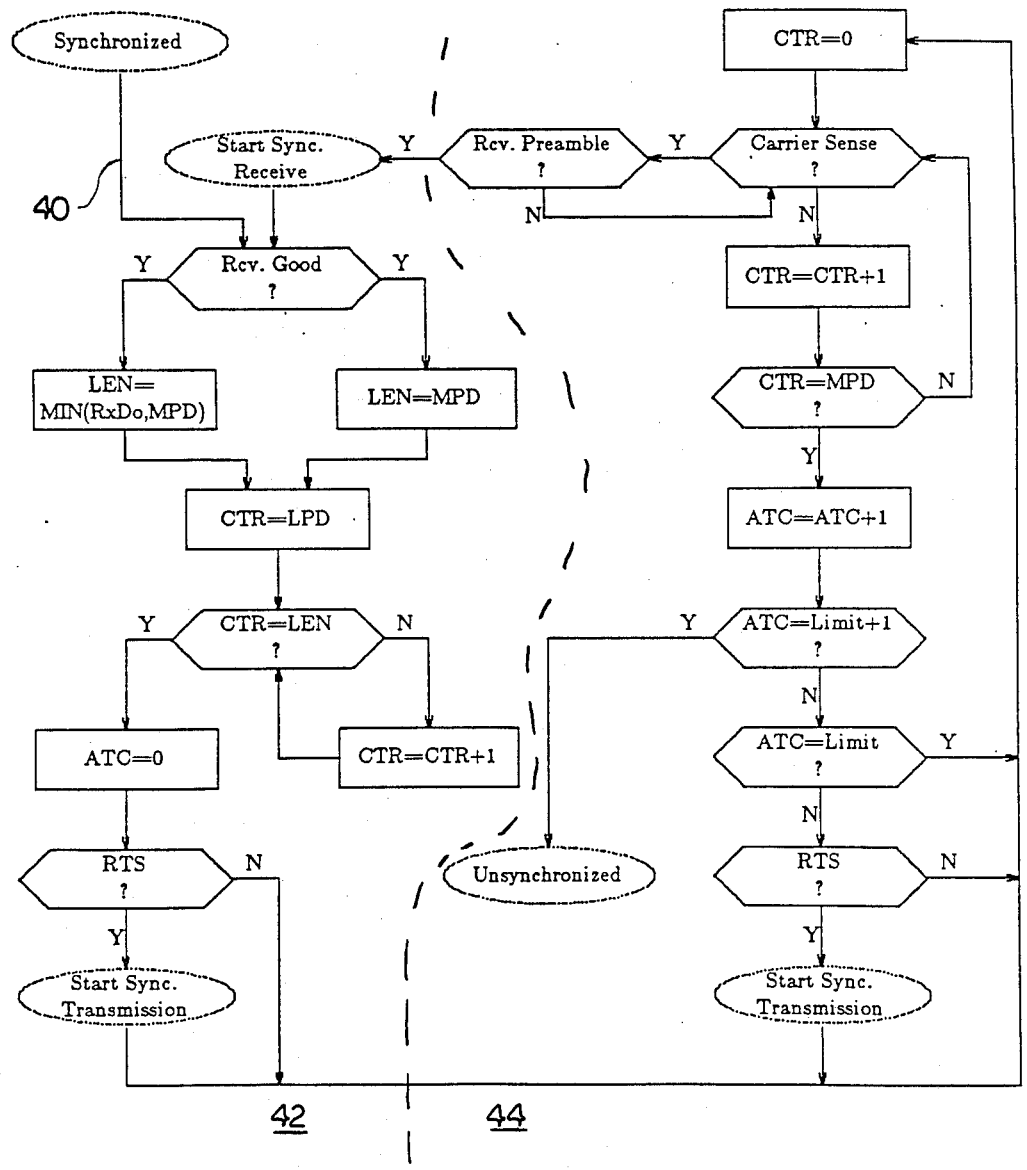
Figure 5-B  Synchronous Mode

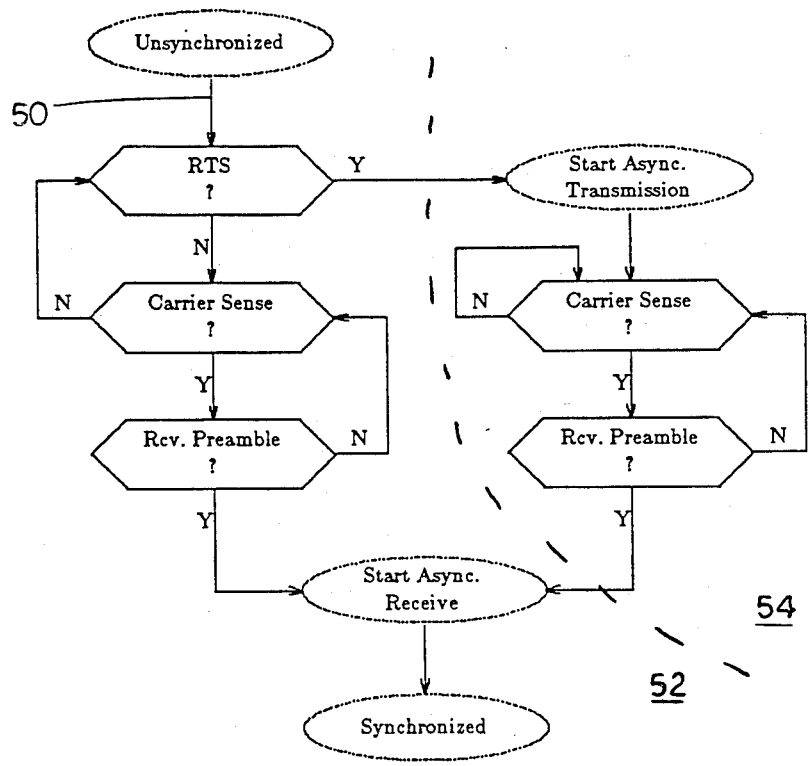
Figure 5-C    Asynchronous Mode

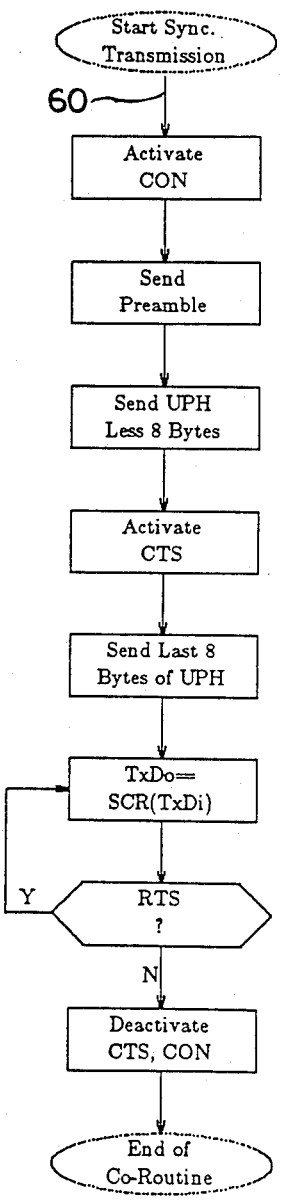
Figure 5-D    Synchronous Transmission

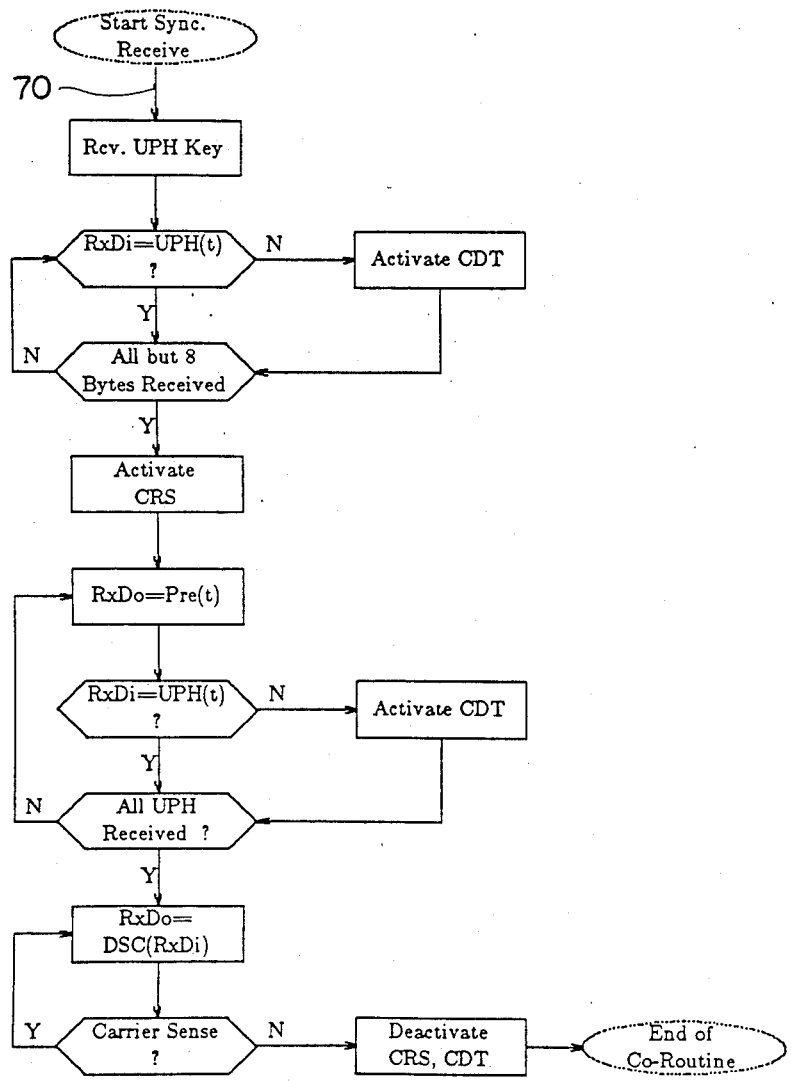
Figure 5-E  Synchronous Reception

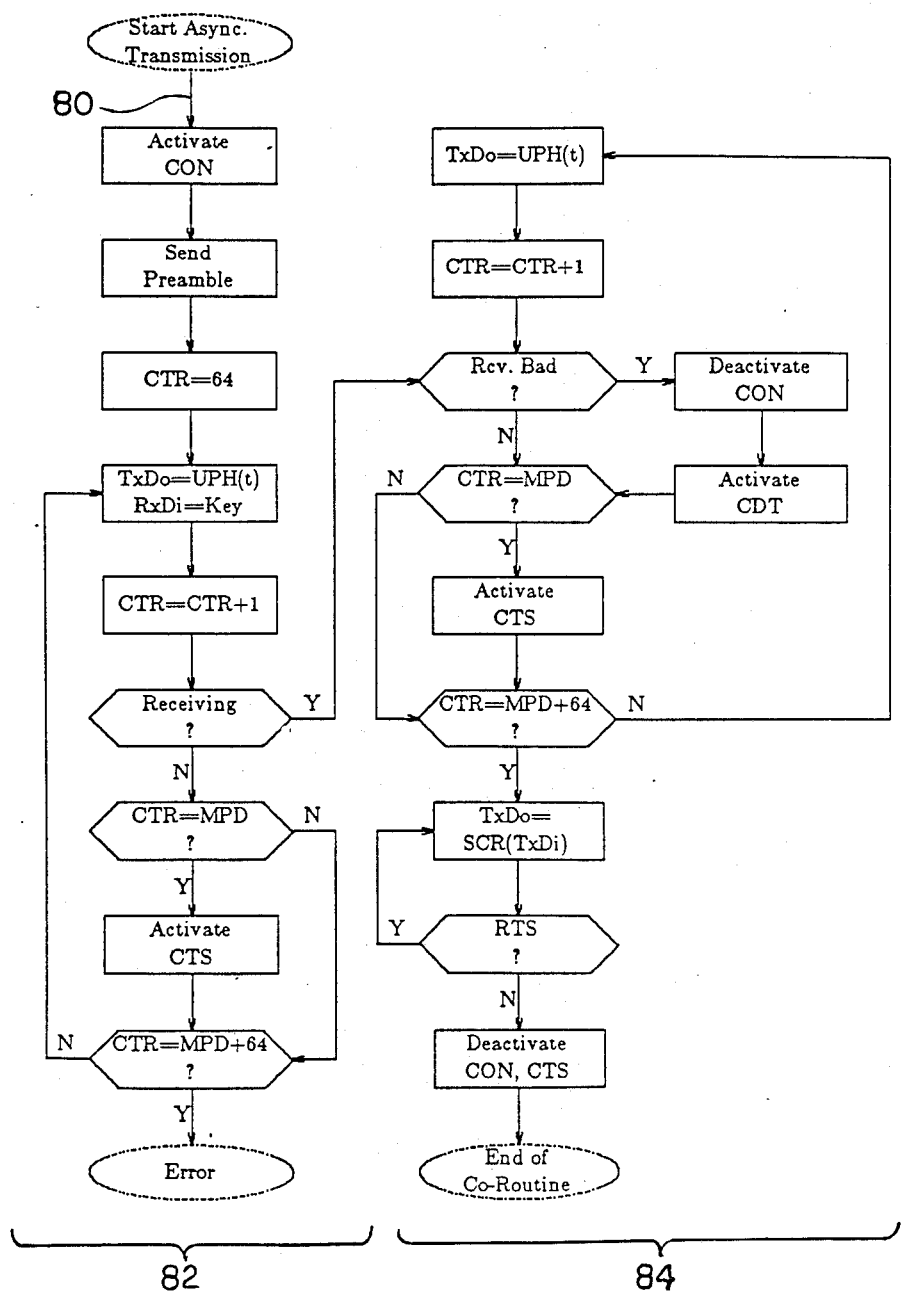
Figure 5-F  Asynchronous Transmission

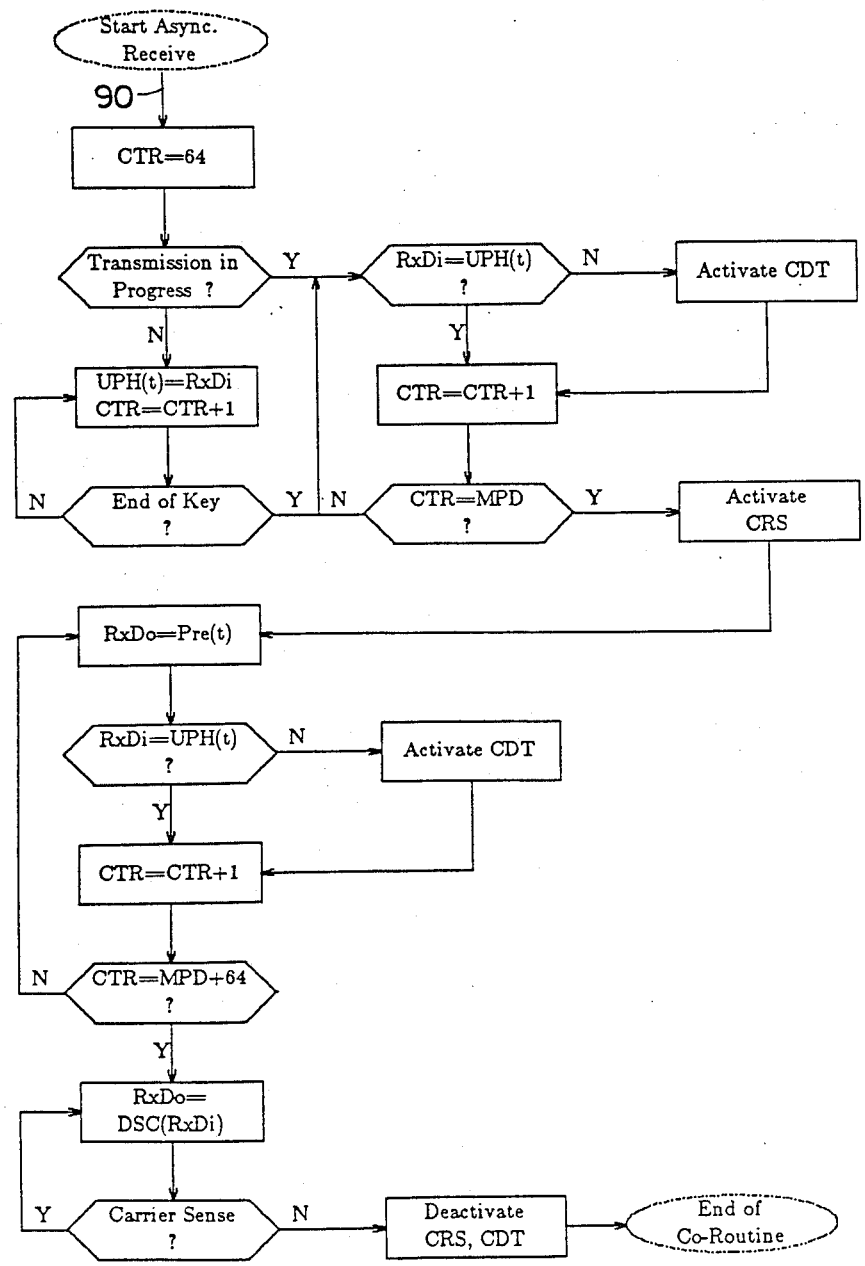
Figure 5-G    Asynchronous Reception

SYNCHRONIZED MULTIPLE ACCESS APPARATUS AND METHOD FOR A LOCAL AREA NETWORK

This invention relates to the operation of local area networks, and more particularly to apparatus and protocol for operating such a local network in a synchronous mode offering improved performance.

A common medium for local area networks is baseband coaxial cable. On these networks the single channel cable is used for both transmission and reception by all nodes. A well known protocol for operation on baseband coaxial cable networks is known as Carrier Sense Multiple Access with Collision Detection (CSMA-CD). In this protocol, a node wishing to transmit senses the channel to see if it is in use. If it finds it idle, it transmits its packet of information serially onto the cable. Because of the time required for signals to propagate along the cable, the sensing may give information that is out of date by as much as one end-to-end propagation time. Thus, a node may see the channel as busy, while at another location the channel is idle. This results in gaps between packets of information in which the information carrying capability of the medium is not used. Alternatively, if a node senses the channels as idle, when in fact another node has already begun to transmit, a collision will result, which can destroy the information in the packets. On baseband coaxial cable networks, these collisions can be recognized by the resulting changes in signaling characteristics. This allows receiving nodes to detect the collision and discard the packet being received. It also allows the transmitting nodes to detect the collision, cease transmission, and try again at a later time. Popular CSMA-CD implementations require that the minimum duration of an information packet exceed the maximum time required for a collision to be detected. With this requirement, any packet that is completely transmitted without a collision being detected by the transmitter, has a very high probability of being received in its entirety at its destination(s)

There presently exist broadband local area networks such as ETHERNET and IEEE 802.3 CSMA-CD Standard networks, which employ the CSMA-CD protocol. These have highly evolved hardware and software support modules, and many user systems have been designed and optimized for CSMA-CD's performance characteristics. Protocols which are incompatible with existing local area networks incur large penalties in price, lead time, and performance of the supporting and supported systems which can outweigh the potential benefits of a new protocol.

It is therefore a primary object of the present invention to provide novel apparatus and protocol with nearly perfect compatibility with existing IEEE 802.3 CDMA-CD Standard modules and systems.

It is a further object of the present invention to provide such apparatus and protocol which offers significant performance improvements over previous access protocols such as CSMA-CD when used on broadband local area networks (LANS), or other networks using separate communication channels for transmission and reception, which are cross connected at a single point.

SUMMARY OF THE INVENTION

The present invention is adapted for operation on a local area network in a synchronous fashion. The local area network includes separate communications channels for transmission and reception of packets having a labeled length. Packets are transferred from the transmit channel to the receive channel at only one point. The local area network includes a plurality of nodes each having an associated round trip propagation delay. Each node includes apparatus adapted to detect the time of arrival of the beginning of a packet. The node apparatus subtracts from the packet's labeled length the predetermined round trip propagation delay of the particular node, this difference being the next time at which the transmission channel will be available at the location of that node. The node can then transmit at this transmission time.

If a node does not have a packet to transmit until after this time, it must wait an additional delay equal to the predetermined maximum roundtrip delay allowed on the network. At this later time, if there have been no new packets received by the node, it is again allowed to transmit. Subsequent times at which transmission is allowed by this node occur at multiples of the predetermined maximum roundtrip delay allowed on the network. This continues until a new packet is received, or until a previously determined multiple of the maximum delay times have passed. If this period is reached, the network is considered to be in synchronous mode, which has the different transmission procedure described later. In this way, time slotting of the network is derived implicitly at each transmitting node based on cues in the existing network traffic and previously derived information about propagation delays and predetermined network maximums.

There are several advantages to the time slotting of the present invention. First of all, if packets are ready for transmission, there is the elimination of dead time between packets that would result from propagation delay if the alternative carrier sense mechanism were used. Furthermore, because of the synchronous operation, collisions occur only at the beginning of packets. Thus, any collisions will propagate through the network within one round trip time of the beginning of transmission of the packet. This attribute allows the minimum synchronous mode packet size to be half as long while still giving collision detection before the end of transmission. The synchronous mode collisions can be more easily detected by including redundant information that is unique to that packet or node at the beginning of a packet. Corrupted information resulting from a collision can be detected by all receivers because of the redundancy. This collision detection technique eliminates the need for bit-by-bit comparison by the transmitting node and for supplemental channels for collision reinforcement.

The network of the present invention enters asynchronous mode when the traffic requirements are sufficiently low. Although this mode is much less efficient, it is of less importance because of the reduced traffic. Following synchronous traffic on the network, nodes must maintain the previously described synchronizing discipline for a previously decided count of transmission instants. On reaching this count, the nodes must wait one additional maximum roundtrip delay before they are allowed to transmit in asynchronous mode. This delay allows time for any packets sent at the last allowable transmission instant to propagate throughout the network without danger of asynchronous collision. Following this, asynchronous mode transmissions can occur any time a node has a packet to send. Since transmissions and collisions are no longer synchronized, collisions may not be recognized until one round trip delay into the receipt of the packet. To compensate, the redundant information at the beginning of the packet is replicated until it is one maximum round trip delay long. This has the effect of making the minimum asynchronous packet size twice as long. In this mode, the sender saves his unique key to the redundant information in his own packet. If the received packet has valid redundant information, but is based on a different key, the sender will recognize the collision prior to visible corruption in the received data and will cease transmission. Thus, the minimum asynchronous packet length is now two round trip times, but asynchronous collisions will last only one maximum round trip time from the beginning of the first of the colliding packets.

When a collision occurs in either the synchronous or asynchronous mode, it is guaranteed that the senders will recognize it and cease transmission within one maximum round trip time from the beginning of the packet (in asynchronous mode, within one round trip time from the beginning of the first packet). This allows collisions of either type to be used to synchronize the network. Collisions are treated like packet whose labeled length equals one maximum round trip delay time.

BRIEF DESCRIPTION OF THE DRAWING

The invention disclosed herein may be better appreciated with reference to the drawing of which:

FIG. 1 is a schematic illustration of a broadband network suited to the novel protocol disclosed herein;

FIG. 2 is a schematic illustration of an information packet;

FIG. 3 is a schematic diagram of a protocol converter for application in the present invention; and FIG. 4 is a schematic diagram of support circuitry utilized with the present invention.

FIGS. 5A–5G are a flow diagrams of the access method disclosed herein;

DESCRIPTION OF THE PREFERRED EMBODIMENT

With reference first to FIG. 1, a broadband local area network 10 includes user nodes 12 and 14. The nodes 12 and 14 are connected to a head end 16 by means of a transmit channel 18 and a receive channel 20. It should be understood that while only two nodes 12 and 14 are shown in FIG. 1, the present invention can accommodate many users spread over a network extending up to 10 kilometers in size with branching of the twin channels as they extend from the head-end. In operation, information packets transmitted by the nodes 12 or 14 travel to the head end 16 and are distributed along the reception channel 20 back to the nodes 12 and 14. It should also be recognized that in general, the nodes 12 and 14 will be different distances from the head end 16. Thus, the round trip propagation delay time for each node in the network 10 will generally be different.

In the protocol of the present invention, operation of the network will generally be in a synchronous mode. Synchronization is achieved implicitly at each node in the following way. When a node such as 12 or 14 receives a packet, it notes the time of its arrival. As will be described in conjunction with FIG. 2, the packet includes a length field from which the length of the particular packet can be derived. With this length of packet information, the receiving node can thus predict when the end of the packet will occur. Each node in the network also has a characteristic round trip propagation delay which is predetermined and which depends on that node's particular location within the network. To achieve synchronization, the node receiving the packet delays its own transmission for a time equal to the packet's labeled length minus the previously determined propagation delay time. In this case, it can be seen that there will be no inter-packet gap since the end of the initially received packet will arrive at the newly transmitting node immediately before it begins to receive its own packet.

As stated above, the present protocol predicts a transmission instant based on length information contained within the information packet. FIG. 2 shows one such packet configuration. The numbers in parentheses are the number of bytes in each section of the packet.

Because of the synchronization implicitly derived at each mode, paclets transmitted from the nodes will all arrive at the head end 16 (FIG. 1) at the same time. Thus, any collisions will occur at the beginning of a packet. With reference again to FIG. 2, the packet includes a unique packet header Section 24 that is different from other packets and includes information that is redundant in a universally recognizable way. If a collision occurs, then each of the nodes will recognize that a collision has taken place from the beginning of the collided packet. This procedure eliminates the need for bit-by-bit comparison by the transmitting node and for supplemental channels for collision reinforcement. Not only does the present protocol eliminate dead time between packets that would result from propagation delay, but also collisions can be recognized within one round trip time of the packet's beginning since the collisions occur only at the beginning of packets.

FIG. 3 depicts the major functional elements of a protocol conversion engine that with the support circuitry of FIG. 4 implements the functions required of a node in the present invention. These elements will be described briefly. A more detailed explanation of the interface signals will be given in conjunction with FIG. 4. Operation of the node as a whole will be described in FIGS. 5-A through 5-G.

The Encoder module, labeled 100, performs the bit by bit transformation of 802.3 packets into PSMA packets. This includes the generation of the synchronizing preamble and Unique Packet Header that are prepended and substituted for the 802.3 synchronizing preamble.

In order that the UPH be unique, it is based on a bit series created at each node in the Encoder module. The Encoder module uses this bit series as the key, that is as the non-redundant part of the UPH, from which it then generates the redundant portion that follows. Next, the encoder module performs a reversible scrambling procedure on the 802.3 packet before transmitting it as the subsequent part of the PSMA packet. This is described further in conjunction with FIG. 5-D.

The Decoder module, labeled 102, regenerates the UPH of received packets based upon a key received as part of that packet, or upon the key used by the encoder. The decoder compares this regenerated UPH with that of the received PSMA packet to determine whether or not corruption from a collision has taken place. It also recreates the 802.3 synchronizing preamble which is stripped off by the Encoder module but is needed to rebuild the complete 802.3 packet. Finally, it performs an inverse of the scrambling Operation of the Encoder to extract the remainder of the 802.3 packet from the PSMA packet.

Timing operations required to achieve and maintain synchronization are performed in the Synchronizer module, labeled 104. This module, with the Encoderand Decoder modules, is controlled by the Master State Machine Controller, labeled 106. The Controller monitors status signals from the other modules and generates control signals which command what operations are to be performed. The Controller also receives interface input signals from the Link Layer Controller through the Access Unit Interface, labeled 108, and from the MODEM through the interface labeled 110. In return, it generates the status and command signals required at both of these interfaces.

The Protocol Converter of FIG. 3 is shown in operational context by FIG. 4. The Converter, labeled 120, interfaces between an 802.3 Link Layer Controller, labeled 122, and a MODEM for the media of the network, labelled 124. In the represented embodiment, the LLC is an Intel 82586 component, and the media is a network of broadband cables as represented by FIG. 1. The LLC in turn is connected to an internal computer bus, labeled 126, of the system to be connected to the network.

Interface signals to the LLC in FIG. 4 are functionally similar to those defined in the Access Unit Interface of IEEE Standard 802.3. The signals supported by the 82586 component, while being a variation of this standard, are particularly simple to use in this application. These signals and there functions are:

| | |
|---|---|
| RTS | Request To Send; notifies the Converter that the LLC is ready to transmit an 802.3 packet and will do so as soon as it receives CTS. |
| CTS | Clear To Send; notifies the LLC that the Converter is ready to receive the 802.3 packet. Used in response to RTS. |
| CRS | Carrier Sense; notifies the LLC that a packet is being received and will be transferred in 802.3 format to the LLC on the RxDo line. |
| CDT | Collision Detect; notifies the LLC that the packet presently being received and presented on the RxDo line is the result of a collision and should be discarded. |
| TxDi | Transmit Data; signal by which 802.3 packets are transferred from the LLC to the Converter. |
| TxC | Transmit Clock; provides bit synchronization for data on the TxDi line. |
| RxDo | Receive Data; signal by which 802.3 packets are transferred from the Converter to the LLC. |
| RxC | Receive Clock; provides bit synchronization for data on the RxDo line. |

The interface signals to the MODEM are:

| | |
|---|---|
| CON | Carrier On; instructs the MODEM to begin modulating the TxDo signal onto the media. |
| TxDo | Transmit Data; signal by which PSMA packets are transferred from the COnverter to the MODEM. |
| TxC | Transmit Clock; provides bit synchronization for data on the TxDo line. Same electrical signal as on the interface to the LLC. |
| RxDi | Receive Data; signal by which PSMA packets are transferred from the MODEM to the Converter. |
| RxC | Receive Clock; provides bit synchronization for data on the RxDi line. Same electrical signal as on the interface to the LLC. |

FIG. 5 is a detailed diagram of a recommended implementation of this synchronizing procedure, including initialization and both synchronous and asynchronous modes. FIG. 5 also illustrates the sending and receiving of packets by the present packet synchronized multiple access (PSMA) protocol.

FIG. 5-A shows the procedure followed by each node prior to learning of its location on the network. Without knowing its local propagation delay, the node cannot synchronize its transmissions to existing channel traffic. For this reason, it must wait until it has determined that the network is in asynchronous mode. In that mode, transmissions are allowed at any time, and so the node can be allowed to transmit without knowing its location.

The flow diagram of FIG. 5-A can be divided into three major sections. The first of these sections, 30, describes how the node waits for the network to be free of traffic for (Limit+1)×MPD bit times, where MPD is the previously decided network wide maximum Propagation Delay expressed in bit transmission times, and Limit is the previously decided number of unused transmission instants that must pass for the network to be considered asynchronous. This is achieved by counting bit times while monitoring the CS signal from the MODEM. If a carrier is sensed, counting is halted while the data received from the MODEM on the RxDi line is monitored for the synchronizing preamble bit pattern. If this pattern is observed, an attempt is made to receive the incoming PSMA packet and convert it into an 802.3 compatible packet for presentation to the 802.3 Link Layer Controller on the RxDo line. This reception and conversion is accomplished by an independently executed co-routine, described in FIG. 5-E, that is initiated at this point.

When this procedure is begun, the node does not know whether or not the network is presently synchronized. The procedure described here makes the assumption that is is synchronized and attempts to receive and decode it accordingly. Alternatively, the network could be presumed asynchronous and the packet decoded that way. One additional method would be to decode it as an asynchronous packet and then if the extension of the UPH (see FIGS. 5-F and 5-G) shows discrepancies decode it as a synchronous packet instead. While this last method provides superior capability, the increased complexity is significant. The inventor doubts that it is worthwhile to do this only to receive the first packet after start-up.

When CS again becomes inactive, the node begins counting bit-times from zero again until a new packet, known to be synchronous, is received, or until the network is known to be asynchronous.

When the network is known to be asynchronous, the node begins to follow the procedure described in the section labeled 32. Here the node waits for a request from the LLC to send a packet. This request can take the form of the RTS signal from the LLC being active. While the node awaits an active RTS, it continues to monitor the receive channel for incoming packets. If a packet is received before RTS becomes active, it will be received as an asynchronous packet by the co-routine shown in FIG. 5-G, after which the node will again begin counting bit times from zero at the time CS goes inactive at the end of the packet.

Alternatively, if a request to transmit is made before any new packets are received, then the 802.3 packet is converted to PSMA and transmitted by an independently executing co-routine. That co-routine, described in FIG. 5-F, includes the use of the counter CTR to monitor the number of bit-times before the transmission is received. The count starts at 64.

After starting to transmit, the node begins to follow the procedure described in the section labeled 34. When a packet is next received, the value of the counter used by the asynchronous receive co-routine is saved as the Local Propagation Delay LPD. This resulting value might be the number of bit-times required for a transmitted packet to propagate to the head end and back plus 64. The asynchronous receive co-routine, started at this point, will determine if the packet received is the one this node sent. If it is, then the LPD value is valid, and the node is now synchronized along with the rest of the network. If it is not, or if the packet was corrupted by collision, then the procedure for determining location on the network begins again.

FIG. 5-B is a flow diagram describing the procedure followed by a node when it and the network are in synchronous mode. It is divided into two major sections labeled 42 and 44. Section 42 describes the derivation of synchronization based on a newly received packet. Section 44 describes the maintenance of synchronization in the absence of new reception. Section 42 will be described first.

Synchronous mode can be entered as a result of establishing location as described in FIG. 5-A, or as a result of packet reception in asynchronous mode as described in FIG. 5-C. In either case, operation according to this flow diagram begins at the point labeled 40.

The presently active receive co-routine determines whether or not the packet is corrupted by collision. If the packet is not corrupted, then the length field in the descrambled data stream RxDo is read to determine the length of the packet, LEN. If the length read is less than the maximum propagation delay, such as if the packet contains only a few bytes of data followed by padding bytes, then LEN is set to MPD. Alternatively, if the packet is corrupted by collision, it cannot be expected to include a valid length field. However, in this situation, the corruption will be noted also by the originator of the packet, who will stop transmitting in less than MPD bit times. LEN is then taken to be MPD.

Next, the counter CTR is initialized to the local propagation delay, and the procedure counts until CTR=LEN. This gives a delay equal to the length of the packet minus the local roundtrip propagation delay. Following this delay, the asynchronous transition counter ATC is reset to zero, indicating that no synchronous slots have been unused since the most recent packet reception. Then, if the node has a packet to send, as indicated by RTS, then the synchronous transmission co-routine of FIG. 5-D is begun. If RTS is inactive the procedure maintains synchronization according to the section labeled 44.

After initializing CTR to zero, the procedure described by section 44 counts to MPD while monitoring the CS signal from the MODEM. If CS becomes active, the count is suspended while the RxDi line is monitored for the synchronizing preamble that marks the start of a packet. If this preamble is observed, the packet is received according to the synchronous receive co-routine shown in FIG. 5-E and the procedure follows the section labeled 42 as described above. If CS stays inactive or becomes inactive without the preamble being observed, the count continues.

When the count reaches MPD, the ATC is incremented and evaluated. If it equals the synchronization limit Limit+1, then the network is no longer synchronized and the asynchronous mode procedure of FIG. 5-C is followed. If it equals Limit, then the last synchronization point has passed but one more MPD period must be waited to allow already sent synchronous packets to propagate through the network. Thus, without allowing a transmission, the counter CTR is looped from 0 to MPD once more before asynchronous mode is entered as described above. If the ATC is less than limit, the RTS signal is checked for a packet available to be sent. If so, the synchronous transmission co-routine in FIG. 5-D is started. In either case, CTR is again set to 0 and the iteration continues as described above until either a packet is received or the network becomes asynchronous.

FIG. 5-C shows the procedure followed by each node when it and the network are in Asynchronous Mode. It has been divided into sections labeled 52 and 54. Entry to the procedure, at label 50, is from the Synchronous Mode procedure described in FIG. 5-B.

In section 52 the node waits for either RTS from the Link Level Controller, indicating a packet is ready for conversion and transmission, or for CS followed by a synchronizing preamble on RxDi from the MODEM indicating that a packet is incoming from the network. If the CS precedes RTS and it is followed by a preamble on RxDi then the Asynchronous Receive Co-routine shown in FIG. 5-G is started, and the node reverts to Synchronous Mode. If RTS goes active first, the node begins following the procedure of section 54.

In section 54, the Asynchronous Transmission Co-routine of FIG. 5-F is begun in response to the RTS. The node then waits for a packet to be received, starts the Asynchronous Receive Co-routine, and reverts to Synchronous Mode.

It should be noted that after a packet is transmitted, no other transmissions can take place until a packet is received. This is a protection mechanism to guard against a node with a broken receiver sending asynchronous traffic on a synchronized network. This is described further with FIG. 5-F.

FIG. 5-D is a flow diagram describing the Synchronous Transmission procedure. This is a co-routine that can be executed simultaneously with the Synchronous Mode procedure. Entry to this routine from Synchronous Mode is at the point labeled 60.

In this procedure, the Converter first activates the CON signal to the MODEM instructing it to turn on its carrier for modulation. Next, a preamble, used for synchronizing the PSMA packets when they are received is sent to the MODEM on the TxDo line. This is followed by a Unique Packet Header for collision detection. Before the last 8 bytes of the UPH is sent, the CTS signal to the Link Layer Controller is made active. This instructs the LLC to begin sending an 802.3 packet on the TxDi line. The first 8 bytes of this packet are the 802.3 synchronizing preamble which is not used. The last 8 bytes of the UPH are sent to the MODEM in its place. The UPH presented to the MODEM on the TxDo line is followed by the remainder of the 802.3 packet in a converted form.

When transmitting digital information, two particular problems can be encountered. The first is difficulty in recovering bit synchronization with the received packet if there is a long sequence of bits which does not cause transitions in the received signal. The second pertains particularly to frequency multiplexed systems such as broadband networks. If a regular pattern of bits repeats itself, it can induce signals in other than the intended frequency ranges, thereby disrupting other uses of the media. Both of these problems can be greatly reduced by scrambling the data according to one of several reversible algorithms. A preferred method is polynomial scrambling based on a randomly chosen key.

Bits received on the TxDi line are scrambled and sent out on the TxDo line as long as the RTS signal from the LLC is active. When RTS becomes inactive, the Synchronous Transmission Co-routine terminates.

It should be noted that the protection mechanism against more than one packet being sent without a packet being received that is present in asynchronous transmissions is not in the procedure described here. In synchronous mode, the CTR needed to detect and handle this condition effectively is in use by the main procedure. Thus, with this method, a node with a broken receiver might possibly attempt more than one transmission while in synchronous mode before it moved into asynchronous mode where the condition will result in a recognized error condition. The inventor considers this a to be a reasonable trade-off of performance against complexity.

The Synchronous Reception Co-routine of FIG. 5-E is entered from either the Locating procedure of FIG. 5-A or the Synchronous Mode of FIG. 5-B at the point labeled 70.

According to this procedure, the node first receives on the RxDi line that part of the Unique Packet Header, called the Key, which is not redundant but is sufficient to predict the remainder of the UPH. This is used to locally generate the UPH. The node compares this UPH with the remainder of the UPH received on the RxDi line. If there is a discrepancy, the Collision Detection signal CDT to the LLC is made active, indicating a collision of packets has taken place. Because of the 802.3 protocol operating in the LLC, this will lead to the deactivation of RTS by the LLC and termination of the 802.3 packet.

8 bytes times (64 bit-times) before the end of the UPH, the Converter makes the CRS signal to the LLC active, alerting it that a packet is being received. It then places the 8 byte 802.3 synchronizing preamble on the RxDo line. The remainder of the 802.3 packet is reconstructed by descrambling the bits received on the RxDi line from the MODEM and passing them to the LLC on the RxDo line following the 802.3 preamble. This conversion continues until the CS signal from the MODEM becomes inactive at the end of the packet, at which time the CRS and CDT signals are made inactive to the LLC and the co-routine terminates.

The Asynchronous Transmission Co-routine shown in FIG. 5-F can be initiated from either the Locating procedure of FIG. 5-A or from the Asynchronous Mode of FIG. 5-C. Entry to this procedure is a the point labeled 80.

The Asynchronous Transmission procedure is similar to the synchronous case, but with two important differences. The first difference is that in order to insure that asynchronous collisions are detected, the Unique Packet Header is made as long as the maximum propagation delay allowed on the network. The second difference is that the status of the Asynchronous Receive Co-routine described in FIG. 5-G is monitored to confirm that the packet being sent is in fact being received back.

This serves two important purposes. If nothing was being received back, it would be an indication of serious system failure in the network or in this node. If the problem were in the receive section of this node, it is important to insure that the failure does not interfere with the use of the network by other nodes. In particular, if the receive section is not operational it is not possible to maintain synchronization. The node would revert to Asynchronous Mode and send packets asynchronously regardless of the actual mode of the network. To prevent this, no new packets are allowed to be transmitted until some something has been received back.

The second purpose is to reduce the time required for the network to recover from asynchronous collisions. Each asynchronously transmitting node monitors the receive channel and stops transmitting if it sees something other than what it sent. In this way, the transmit channel is guaranteed to become available for use within one Maximum Propagation Delay period from the beginning of the first of the asynchronously colliding packets. This allows asynchronous collisions to be used to synchronize the network.

Starting at the point labeled 80, the node activates the CON signal to the MODEM instructing it to turn on its carrier for modulation, then initializes the CTR to 64. Next, the node places the PSMA synchronizing preamble on the TxDo line followed by a Unique Packet Header. The duration of the UPH is determined by incrementing the CTR with each bit until it reaches the value MPD+64. Along the way, when CTR=MPD, which is 8 byte times before the end of the UPH, the Converter activates the CTS signal to the Link Layer Controller. This causes the LLC to begin transferring a 802.3 packet into the TxDi line. As explained with FIG. 5-D, the first 8 bytes of the 802.3 packet are the 802.3 synchronization preamble which is not used.

While the UPH is being transmitted, the key portion is saved for use by the receive procedure. If no packets are received from the network, the procedure follows the section labeled 82 in the diagram. If the full UPH of length MPD is transmitted without a packet being received it is recognized as an error condition. For the purposes of this application it may be assumed that at this point the node stops all transmissions and signals the error in whatever manner the implementor deems appropriate.

If a packet begins to be received, the procedure advances to the section labeled 84. If the packet being received is found to be corrupted, then the procedure of section 84 deactivates the CON signal to the MODEM, causing it to stop modulating of data onto the network, and activates CDT to the LLC alerting it to the collision that has taken place. This will cause the LLC to deactivate the RTS signal and stop transfer of the 802.3 packet if it has begun.

In the absence of a collision or error condition, the procedure of section 84 completes the UPH, and follows it immediately with the scrambled 802.3 packet in the same manner as was described for FIG. 5-D. This contiurs until the LLC signals the end of the 802.3 packet by deactivating RTC.

When RTS is inactive the converter deactivates CTS, and CDT if it was activated, and the co-routine terminates.

The Asynchronous Reception Co-routine represented by the flow-diagram of FIG. 5-G can be initiated from either the locating procedure of FIG. 5-A or from the Asynchronous Mode of FIG. 5-C. Entry is at point 90.

The Asynchronous Reception procedure is similar to the Synchronous Reception procedure of FIG. 5-E but like the Transmission procedure includes two important differences. These differences are the reception and checking of the extended Unique Packet Header that is used in Asynchronous mode, and in the case of a transmission in progress, the use of a UPH key that has been saved from the oustanding asynchronous transmission.

As in the Asynchronous Transmission Co-routine of FIG. 5-F, the CTR is used to measure the length of the UPH. It is initialized to 64 bit-times. If an asynchronous transmission is not in progress, the UPH key is taken from the RxDi data stream from the MODEM. If a transmission is active, the key is the one saved when the packet was sent, as shown in FIG. 5-F. In either case, the subsequent portion of the UPH is generated by the node and compared to RxDi such that any corruption from collisions will be detected. If a difference is found, the CDT signal to the Link Layer Controller is made active. The status of reception and whether or not the received packet is corrupted may be monitored by the Asynchronous Transmission Co-routine as described previously.

8 bytes before the end of the UPH, when CTR=MPD, the CRS signal to the LLC is made active. The remainder of the procedure is identical to the Synchronous Reception Co-routine of FIG. 5-E.

It is thus seen that the objects of this invention have been achieved in that there has been disclosed method and apparatus for effecting the method of operating a local area network in a synchronized fashion. The disclosed protocol improves performance measures such as packet throughput and delay for various traffic characteristics, maximum network size, and the bandwidth that is occupied on a broadband cable plan. For contention networks with which the present invention is concerned, these performance values result from more basic features that are also improved. These basic features are minimum packet length, dead time between packets (inter-packet gap), collision (or accumulation) window time, which affects the likelihood of collisions, and the use of distributed collision detection. In addition to improving the above-mentioned performance measures, the present method permits implementations with nearly perfect compatibility with existing local area networks complying with the IEEE 802.3 Standard.

It is recognized that modifications and variations of the present invention will occur to those skilled in the art based on the present disclosure. It is intended that all such modifications and variations be included within the scope of the appended claims.

What is claimed is:

1. In a local area network using separate communications channels for transmission and reception of packets having a labeled length including a plurality of nodes with associated round trip propagation delays, the packets being transferred from the transmit and receive channels at a single point, node apparatus for operating the network in a synchronous mode comprising; means for detecting the time of arrival of the beginning of a packet; means for subtracting from the packet's labeled length the predetermined round trip propagation delay of the node, this difference being added to the time of arrival to generate the transmission time; and means for transmitting a packet at the transmission time.

2. The node apparatus of claim 1 wherein the packets include redundant information at the beginning of the packet for collision detection.

3. Local area network comprising: a plurality of nodes interconnected for transmission and reception of packets on separate communications channels, the packets being transferred from the transmit and receive channels at a single point, each node including node apparatus adapted for operating the network in a synchronous mode, the node apparatus comprising; means for detecting the time of arrival of the beginning of a packet containing its labeled length; means for subtracting from the packet's labeled length the predetermined round trip propagation delay of the node, this difference being added to the time of arrival to generate the transmission time; and means for transmitting a packet at the transmission time.

4. The local area network of claim 3 wherein the packets include redundant information at the beginning of the packet for collision detection.

* * * * *